United States Patent
Wong

(10) Patent No.: US 9,631,518 B2
(45) Date of Patent: *Apr. 25, 2017

(54) EXHAUST DIFFUSER AND METHOD FOR MANUFACTURING AN EXHAUST DIFFUSER

(75) Inventor: Li Shing Wong, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 406 days.

This patent is subject to a terminal disclaimer.

(21) Appl. No.: 14/237,872

(22) PCT Filed: Aug. 1, 2012

(86) PCT No.: PCT/EP2012/065056
§ 371 (c)(1),
(2), (4) Date: Feb. 8, 2014

(87) PCT Pub. No.: WO2013/026667
PCT Pub. Date: Feb. 28, 2013

(65) Prior Publication Data
US 2014/0174052 A1    Jun. 26, 2014

(30) Foreign Application Priority Data

Aug. 19, 2011   (EP) .................................... 11178142

(51) Int. Cl.
*F01D 25/30* (2006.01)
*F01D 5/14* (2006.01)
*F01D 25/16* (2006.01)

(52) U.S. Cl.
CPC ............. *F01D 25/30* (2013.01); *F01D 5/145* (2013.01); *F01D 25/162* (2013.01); *F01D 5/146* (2013.01);
(Continued)

(58) Field of Classification Search
CPC ........ F01D 25/30; F01D 25/162; F01D 5/145; F01D 5/146; F05D 2240/12; F05D 2220/321; Y02T 50/673
See application file for complete search history.

(56) References Cited

U.S. PATENT DOCUMENTS 6,508,630 B2 *  1/2003  Liu ........................ F01D 5/145
                                                     416/228
6,554,569 B2   4/2003  Breeze-Stringfellow
(Continued)

FOREIGN PATENT DOCUMENTS

EP      0798447 B1    9/2001
EP      1674664 A2    6/2006
(Continued)

OTHER PUBLICATIONS

EP Search Report dated Oct. 28, 2016, for EP patent application No. 12742904.1.

*Primary Examiner* — Carlos A Rivera
(74) *Attorney, Agent, or Firm* — Beusse Wolter Sanks & Maire

(57) ABSTRACT

An exhaust diffuser and method for manufacturing an exhaust diffuser is provided. An exhaust diffuser for a torque-generating turbine, in particular a torque-generating gas turbine is provided, the exhaust diffuser having an inner member, and the inner member having an outer surface. The outer member having an inner surface, and the inner member and the outer member forming an annular channel at least a first supporting strut connecting the inner member and the outer member, the supporting strut extending essentially radially from the inner surface to the outer surface, the supporting strut having a middle section, the middle section having a first airfoil and an outer section having a second airfoil, and the second airfoil having a higher angle of
(Continued)

incidence than the first airfoil. Furthermore, it is described a method for manufacturing an exhaust diffuser.

15 Claims, 5 Drawing Sheets

(52) U.S. Cl.
CPC .... *F05D 2220/321* (2013.01); *F05D 2240/12* (2013.01); *Y02T 50/673* (2013.01)

(56) References Cited

U.S. PATENT DOCUMENTS

| | | | |
|---|---|---|---|
| 6,886,776 B2* | 5/2005 | Wagner | B64C 3/56 244/12.1 |
| 7,195,456 B2* | 3/2007 | Aggarwala | F01D 5/145 415/208.2 |
| 2003/0035723 A1 | 2/2003 | Breeze-Stringfellow | |
| 2004/0251383 A1* | 12/2004 | McDonnell | B64C 27/615 244/82 |
| 2009/0324400 A1 | 12/2009 | Findlay | |
| 2010/0307165 A1* | 12/2010 | Wong | F01D 25/162 60/796 |
| 2011/0052373 A1 | 3/2011 | Sparks | |
| 2011/0225979 A1* | 9/2011 | Hoeger | F01D 5/143 60/796 |
| 2014/0205448 A1* | 7/2014 | Wong | F01D 5/145 415/207 |

FOREIGN PATENT DOCUMENTS

| | | |
|---|---|---|
| EP | 2133573 B1 | 8/2011 |
| GB | 657366 A | 9/1951 |
| WO | 0061918 A2 | 10/2000 |
| WO | 2010063271 A2 | 6/2010 |

* cited by examiner

EXHAUST DIFFUSER AND METHOD FOR MANUFACTURING AN EXHAUST DIFFUSER

CROSS REFERENCE TO RELATED APPLICATIONS

This application is the US National Stage of International Application No. PCT/EP2012/065056 filed Aug. 1, 2012, and claims the benefit thereof. The International Application claims the benefit of European Application No. EP 11178142, filed Aug. 19, 2011. All of the applications are incorporated by reference herein in their entirety.

FIELD OF INVENTION

The present invention relates to the field of torque-generating turbines, in particular torque-generating gas turbines. More particularly, the invention relates to an exhaust diffuser for a torque-generating turbine, in particular a torque-generating gas turbine, and a method for manufacturing an exhaust diffuser.

ART BACKGROUND

Torque generating turbines are rotary engines that extract energy from a fluid flow, e.g. steam flow and/or combustion gas flow, and convert it into useful work. Typically, torque-generating turbines are used to drive a generator to produce electric energy. Usually, a torque-generating turbine comprises a stator and a rotor having one or several turbine stages.

In a turbine stage fluid, e.g. steam or exhaust gas, is directed onto the rotor by the fixed vanes of the stator. It leaves the stator as a jet that fills the entire circumference of the rotor. The flow then changes direction and increases its speed relative to the speed of the blades. A pressure drop occurs across both the vane and the blade, with flow accelerating through the vane and decelerating through the blade, with no significant in flow velocity before and after the stage (vane inlet and blade outlet) but with a decrease in both pressure and temperature, reflecting the work performed in the driving of the rotor.

Torque-generating gas turbines additionally comprise a compressor and a combustion chamber. The compressor having a stator and a rotor like the turbine typically has several stages as described in the paragraph hereinbefore. However, in the compressor both pressure and temperature increases from the first to the last stage, reflecting the work performed by the turbine in the driving of the rotor of the compressor. The compressor compresses ambient air before it is mixed with fuel in the combustion chamber to generate a burning mixture. The exhaust gas is then fed into the turbine in the narrower sense where it expands. After a portion of the turbine, e.g. after 2 stages, an intermediate diffuser may be provided for reducing the speed of the fluid flow such that its flow adapts smoothly to the geometry of the downstream turbine stages. After the last turbine stage there is a diffuser that decelerates the flow as much as possible to minimize the pressure drop and thereby improve the performance of the turbine and the gas turbine as a whole before it is exhausted through the stack. The compressor also has a diffuser after its last stage to minimize the pressure drop. The rotating rotor of the turbine then drives the compressor and for example a generator.

The junction of the vanes of the stators of either the compressor stages or the turbine stages with the outer or inner surfaces may be sources of horseshoe vortexes and may thus impede, that the fluid flow is optimally redirected onto the rotor.

EP 1 674 664 A2 relates to an exit guide vane array for thrust generating military aircraft engines, which includes a set of guide vanes having a solidity and defining fluid flow passages with a chordwisely converging forward portion. The high solidity and convergent passage portion resist fluid separation. The vanes cooperate with each other to restrict an observer's line of sight of planes upstream of the van array.

In EP 0798447 B1 a gas turbine guide vane with an enlarged filled radius near the end wall has been proposed to reduce the amount of drag generating vortexes. Furthermore, WO 00/61918 suggests enlarging the leading edge radius near the end walls. In WO 2010/063271 it has additionally been proposed to enlarge the cross sectional area of struts supporting annular channels connecting subsequent turbine stages of a thrust generating aircraft gas turbine.

The fluid flow velocity after the rotor may still be significant. Accordingly, turbines are provided after the last rotor with an exhaust diffuser to slow down the fluid flow and thereby enhance pressure recovery.

The exhaust diffuser typically comprises an inner member having an outer surface and an outer member having an inner surface, wherein the inner member and the outer member form an annular channel. The inner member has to be supported within the outer member. Accordingly, the exhaust diffuser comprises struts extending essentially radially from the outer surface of the inner member to the inner surface of the outer member. Typically, the struts have a prismatic design with a cross section that does not change across the span from the outer surface of the inner member to the inner surface of the outer member.

The cross section of the strut typically has the form of an airfoil, i.e. it is shaped aerodynamically to reduce the drag induced by the strut as far as possible. The strut often has more than one function. Maintaining the distance between the inner member and outer member, transfer forces from the rotor via the bearing to the casing, provide inspection access to the area inside the inner member, provide passage for instrumentation wiring, supply and drain routes of air and lubrication oil to bearing.

Several parameters may characterize an airfoil: —chord line, —chord, —thickness, —mean camber line, —camber, —leading edge radius The chord line is shortest line connecting leading edge and trailing edge of an airfoil. Accordingly, the chord denotes its length. Unless otherwise stated, further dimensions of an airfoil are always given relative to the chord. The thickness of an airfoil indicates the maximum extension perpendicular to the chord line. The mean camber line is the line connecting the points midway between the upper surface and the lower surface of an airfoil along the chord line. The camber expresses the maximum distance between the camber line and the chord line. For symmetric airfoils chord line and camber line are identical and thus the camber is zero, of course. The leading edge radius is the radius, which may be fitted to the leading edge of the airfoil.

A fluid flow component at the inlet of the exhaust diffuser may comprise a component transversal to the exhaust diffuser, i.e. may enclose a flow angle different from zero with an axis of the annular channel of the exhaust diffuser. The flow angle may depend on the capacity of the torque-generating turbine or its operating point, e.g. load or speed, and the radial distance of the fluid flow component from the axis of the annular channel of the exhaust diffuser.

The flow angle significantly affects pressure recovery of an exhaust diffuser. It has been shown that an exhaust diffuser may show good performance up to a flow angle of 15 degree whereas steep losses occur thereafter.

The angle of incidence of an airfoil of conventional prismatic struts, i.e. the angle between the chord line and the axis of the exhaust diffuser, is typically selected to be zero or to be equal to the mean inlet flow angle. Hence, the angle of attack, i.e. the angle between the fluid flow and the chord line of the airfoil may therefore vary across the span of the prismatic strut. If the angle of attack becomes too high or too low flow separation may occur and large regions of low momentum fluid may be generated. These may lead to blockages and endanger pressure recovery of the exhaust diffuser. Accordingly, airfoils supporting a large range of angle of attack, in particular airfoils having a large leading edge radius have been used hereinbefore. However, airfoils supporting a large range of angle of attack may have a higher drag coefficient when the angle of attack is low thus rendering the exhaust diffuser less efficient.

US 2011/0052373 A1 proposes a supporting strut comprising a channel from the pressure side to the suction side of an airfoil to avoid flow separation. However, this supporting strut has a significant cross-section when the angle of attack is low going along with a high drag.

US 2009/0324400 A1 suggests a gas turbine for use in subsonic flight wherein a supporting strut for the thrust generating nozzle of the gas turbine is provided with a channel to reduce strut wake loss.

There may be a need for a more efficient exhaust diffuser being at the same time less prone to blockages.

SUMMARY OF THE INVENTION

This need may be met by the subject matter described herein. Advantageous embodiments of the present invention are further described herein.

According to a first aspect of the invention there is provided an exhaust diffuser for a torque-generating turbine, in particular a torque-generating gas turbine, the exhaust diffuser comprising an inner member having an outer surface and an outer member having an inner surface, the inner member and the outer member forming an annular channel, at least a first supporting strut connecting the inner member and the outer member, the supporting strut extending essentially radially from the inner surface to the outer surface, the supporting strut comprising a middle section having a first airfoil and an outer section having a second airfoil, and the second airfoil having a higher angle of incidence than the first airfoil.

The flow angle may be higher near the inner surface of the outer member. Accordingly, a higher angle of incidence of the second airfoil may result in a lower angle of attack. A lower angle of attack may lead to lower drag and may thus enhance pressure recovery of the exhaust diffuser.

According to a first embodiment of the exhaust diffuser for a torque-generating turbine the first supporting strut comprises an inner section having a third airfoil and the third airfoil having a lower angle of incidence than the first airfoil and/or the second airfoil.

Near the outer surface of the inner surface the flow angle during operation of the torque-generating turbine may be very low, in particular negative. Adapting the angle of incidence of the third airfoil such that it is lower than the angle of incidence of the first airfoil and/or the second airfoil may therefore result in a lower angle of attack at the inner section of the supporting strut reducing drag and augmenting pressure recovery of the exhaust diffuser.

According to a second embodiment of the exhaust diffuser for a torque-generating turbine the difference between the angle of incidence of the third airfoil and the angle of incidence of the second airfoil is between 0° and 40°, in particular between 5° and 30°, more particularly between 5° and 20°.

A difference in angle of incidence between 0° and 40° may be advantageous in case of a torque-generating turbine being operated in a wide power range to respect the significant deviations in flow angle associated therewith. A range of 5° to 30° may be preferred when the torque-generating turbine is only operated in a limited power range and thus changing flow angles are less common. Selecting the difference in angle of incidence to be between 5° and 20° may simplify manufacturing of the supporting strut.

According to another embodiment of the exhaust diffuser for a torque-generating turbine the second airfoil differs from the first airfoil in shape to be able to handle a higher range of angle of attack with respect to the first airfoil.

The range of angle of attack an airfoil may be able to handle depends on its shape. Typical parameters, which may influence this property, are inter alia leading edge radius, trailing edge radius, camber. A person skilled in the art knows the range of angle of attack a particular airfoil may handle. Hence, a person skilled in the art may select an airfoil based on this parameter.

A second airfoil having a shape capable of handling a higher range of angle of attack may help to avoid flow separation near the inner surface of the outer member, where the flow angle may change rapidly compared to the flow angle in the middle between outer surface of the inner member and inner surface of the outer member. Hence, diffuser blockages may be avoided and pressure recovery enhanced.

According to a yet another embodiment of the exhaust diffuser for a torque-generating turbine the third airfoil differs from the first airfoil in shape to be able to handle a higher range of angle of attack with respect to the first airfoil.

The flow angle near the outer surface of the inner member may deviate from the flow angle in the middle between the outer surface of the inner member and the inner surface of the outer member, too. A third airfoil having a shape capable of handling a higher range of angle of attack may reduce the amount of low momentum fluid in this region and further improve pressure recovery.

According to a further embodiment of the exhaust diffuser for a torque-generating turbine the first airfoil has a smaller thickness than the second airfoil and/or the third airfoil.

A thinner first airfoil may have a lower drag coefficient than the first airfoil and/or the third airfoil. Accordingly, pressure recovery along the exhaust diffuser may be improved. Hence, a torque-generating turbine, in particular a torque-generating gas turbine, provided with such an exhaust diffuser may be more efficient.

According to a still further embodiment of the exhaust diffuser for a torque-generating turbine the first airfoil has a smaller leading edge radius than the second airfoil and/or the third airfoil.

Although an airfoil with a smaller leading edge radius may support a lower range of angle of attack it may have the advantage of lower drag and thus to improve the efficiency of the exhaust diffuser.

However, a smaller leading edge radius does not necessarily go along with a lower range of angle of attack and vice versa as other parameters of the airfoil may influence its aerodynamics, too.

According to another embodiment of the exhaust diffuser for a torque-generating turbine the first airfoil has a smaller camber than the second airfoil and/or the third airfoil.

While a higher camber may allow for supporting a higher range of angle of attack, a smaller camber may reduce the drag of the first airfoil. Flow angle deviations in the middle section of the supporting strut may be less severe.

Accordingly, the permissible range of angle of attack may be less important than the drag coefficient. In particular, the camber of the first airfoil may be zero, i.e. the first airfoil may be a symmetric airfoil. A symmetric airfoil may result in very low drag if the angle of attack is approximately zero.

According to yet another embodiment of the exhaust diffuser for a torque-generating turbine the exhaust diffuser comprises a second supporting strut and the first supporting strut and the second supporting strut are arrange such as to form a twin-strut with an in flow-direction narrowing channel therein between.

A twin-strut may be regarded as a first supporting strut and second supporting strut being arranged side-by-side in close proximity to one another.

A twin-strut comprising an in flow-direction narrowing channel may reduce the risk of flow separation even under severe angle of attack.

According to a further embodiment of the exhaust diffuser for a torque-generating turbine the first supporting strut and the second supporting strut form a minor symmetric twin-strut.

A mirror symmetric twin-strut may particularly easy to design and to manufacture.

According to a still further embodiment of the exhaust diffuser for a torque-generating turbine the exhaust diffuser has eight or fewer first supporting struts and/or second supporting struts, in particular six or fewer first supporting struts and/or second supporting struts.

Reducing the number of supporting struts may reduce drag losses. Accordingly, the efficiency of the exhaust diffuser may be improved. The supporting struts may all have the same shape or differ in their appearance.

According to yet another embodiment of the exhaust diffuser for a torque-generating turbine the exhaust diffuser has four or fewer twin-struts, in particular three or fewer twin-struts.

Twin-struts may further help to reduce the amount of supporting struts while maintaining the structural stability of the exhaust diffuser.

According to a further embodiment of the exhaust diffuser for a torque-generating turbine the exhaust diffuser has an even number of first supporting struts and/or second supporting struts.

An even number of first supporting struts and/or second supporting struts may facilitate the arrangement of said struts around the circumference of the inner member.

According to a still further embodiment of the exhaust diffuser for a torque-generating turbine the exhaust diffuser has an odd number of first supporting struts and/or second supporting struts.

An odd number of first supporting struts and/or second supporting struts may result in a lower total number of said struts and thus in lesser drag.

According to a second aspect of the invention there is provided a method for manufacturing an exhaust diffuser for a torque-generating turbine as has been described hereinbefore.

According to this description "inner" means radial inwards in respect of an axis of rotation of the turbine; "outer" means radial outwards in respect of an axis of rotation of the turbine. Particularly in a diverging annulus, "inner member" means a part that defines a first boundary of the annulus and "outer member" means a part that defines a second boundary of the annulus, wherein the second boundary has a greater distance to an axis of rotational symmetry than the first boundary.

"Higher" angle of incidence of a first airfoil in comparison to a second airfoil may mean that compared to the direction of the mean inlet flow of the diffuser inlet of the gas turbine, the first airfoil has a greater angle between its chord line and the mean inlet flow than an angle between a chord line of the second airfoil and the mean inlet flow.

Besides "higher angle" may mean that the absolute value of a first angle is greater than the absolute value of a second angle. Thus, the algebraic sign of the angle is disregarded so that is does not matter whether is section is twisted clockwise or counter-clockwise.

"Higher" angle of attack of a first airfoil in comparison to a second airfoil may mean that compared to the direction of local fluid flow in the diffuser of the gas turbine, the first airfoil has a different angle between its chord line and the direction of the local fluid flow passing along the first airfoil than an angle between a chord line of the second airfoil and the direction of the local fluid flow passing along the second airfoil.

The first and the second airfoil may be a common part but may only define different sections of the common part.

The torque-generating turbine may particularly be a gas turbine engine.

The feature that the second airfoil has a higher angle of incidence than the first airfoil particularly means that the strut is twisted.

It has to be noted that embodiments of the invention have been described with reference to different subject matters. In particular, some embodiments have been described with reference to methods whereas other embodiments have been described with reference to apparatuses. However, a person skilled in the art will gather from the above and the following description that, unless otherwise notified, in addition to any combination of features belonging to one type of subject matter also any combination between features relating to different subject matter, in particular between features of the methods and features of the apparatuses are considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
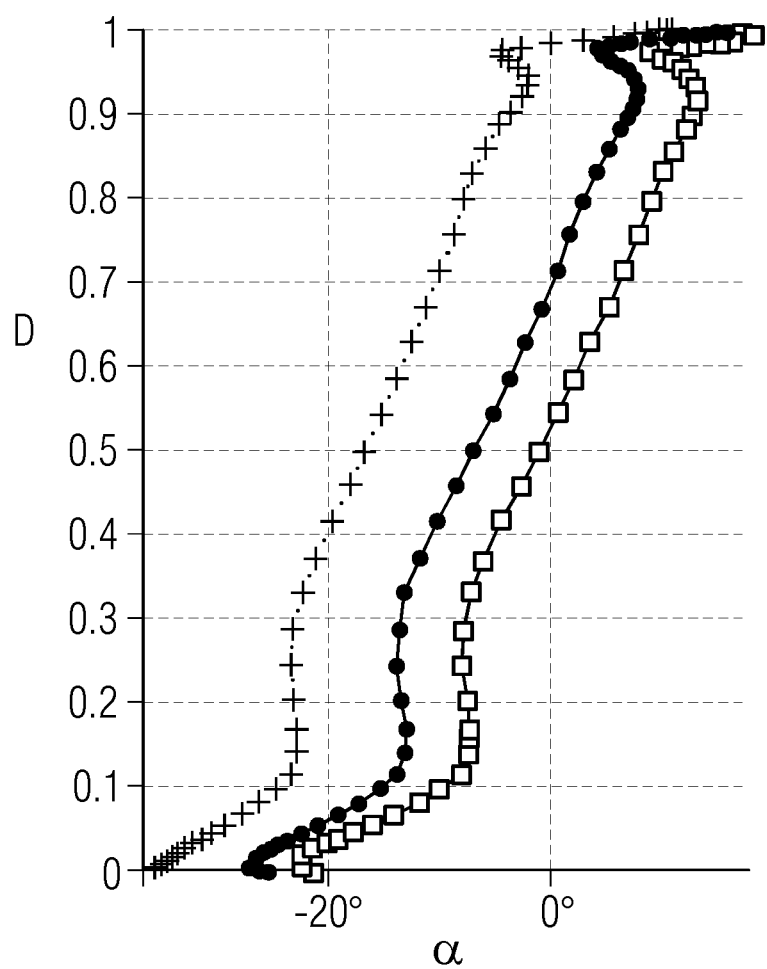
FIG. 1 shows the flow angle of a fluid flow entering an exhaust diffuser versus the normalized distance from the outer surface of its inner member to the inner surface of its outer member for three different capacities of a typical torque-generating turbine.

The illustration in the drawing is schematically provided.

FIG. 1 shows the flow angle a of the fluid flow entering an exhaust diffuser versus the normalized distance D from the outer surface of its inner member to the inner surface of its outer member for a low, middle and high capacity of a torque-generating gas turbine. For a middle capacity the flow angle varies from −27 degree at the outer surface of the inner member of the exhaust diffuser to approximately 10 degree at the inner surface of the outer member of the exhaust diffuser. The mean flow angle is approximately 5 degree, which allows for good diffuser recovery.

In particular, near the outer surface and the inner surface the flow angle gradient is quite extreme. Accordingly, it may be advantageous to treat these end wall regions differently.

Figure 2:
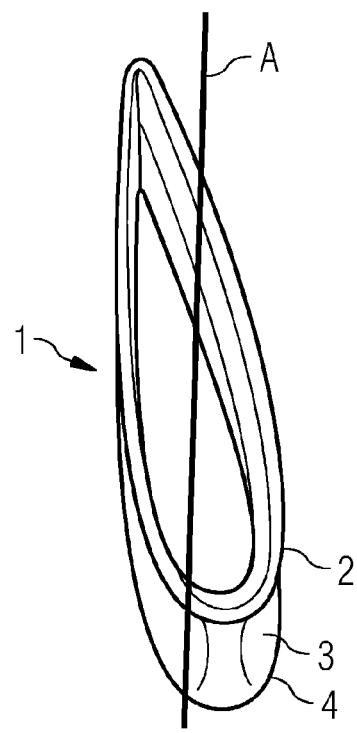
FIG. 2 shows a prismatic strut.

FIG. 2 shows a prismatic supporting strut 1 comprising an outer section 2, a middle section 3, and an inner section 4 the airfoils of which all have the same angle of incidence. A line A indicates the axis of the exhaust diffuser.

Figure 3:
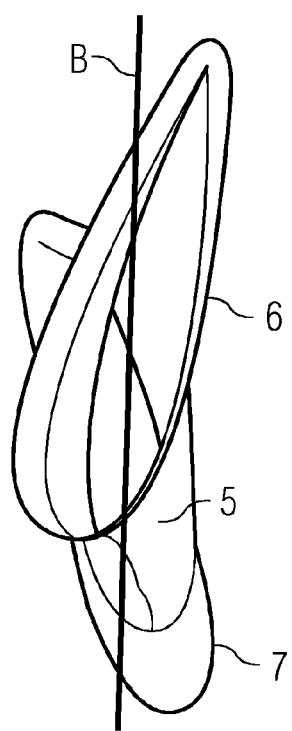
FIG. 3 shows an exemplary embodiment of a supporting strut for an exhaust diffuser.

FIG. 3 shows an exemplary embodiment of a supporting strut for an torque-generating exhaust diffuser comprising a middle section 5 having a first airfoil, an outer section 6 having a second airfoil and an inner section 7 having a third airfoil. A line B indicates the axis of the exhaust diffuser.

The first airfoil has a lower thickness than the second airfoil and the third airfoil. The lower thickness of the first airfoil leads to a lower drag coefficient when the angle of attack is low in particular in the middle section 5 of the strut. The second airfoil and the third airfoil have a larger leading edge radius. The second airfoil and the third airfoil may handle a higher range of angle of attack. Hence, the despite the large deviations of flow angle near the outer surface of the inner member and the inner surface of the outer member flow separation may be avoided.

Furthermore, the second airfoil and the third airfoil have an orientation different from the first airfoil. The second airfoil is adapted to a higher flow angle than the first airfoil and the third airfoil is adapted to a lower, in particular negative, flow angle than the first airfoil.

The twisted supporting strut with changing incidence of first airfoil, second airfoil and third airfoil like that shown in FIG. 3 may improve the pressure recovery coefficient compared to a standard single angle of incidence supporting strut.

Figure 4:
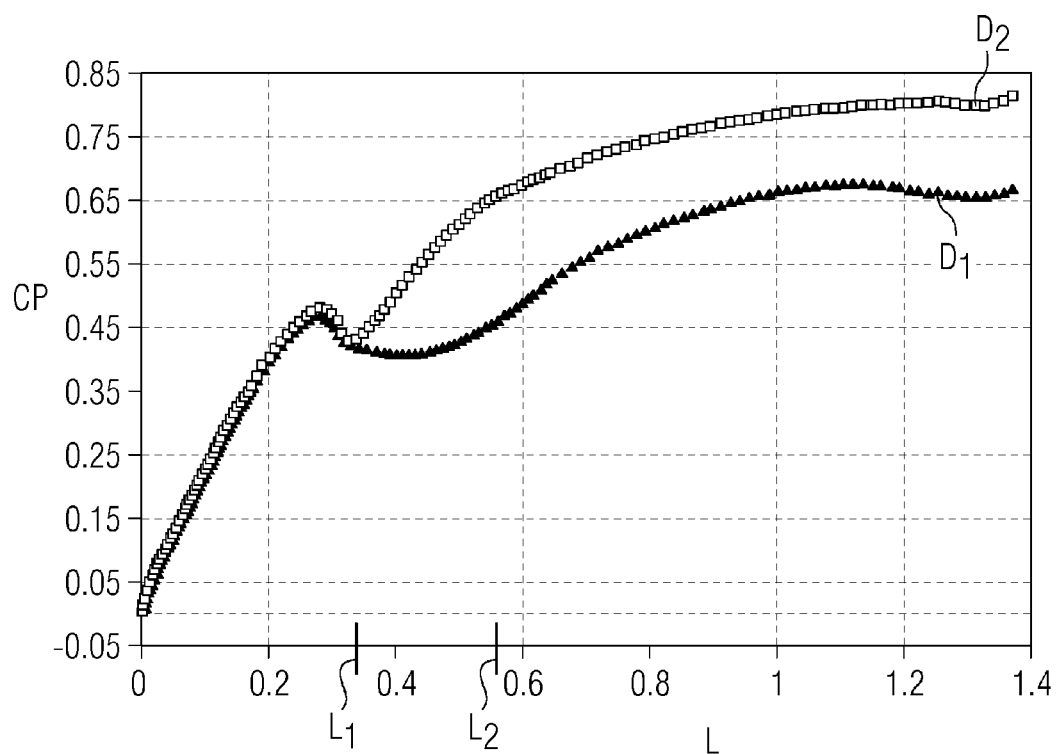
FIG. 4 shows a pressure recovery coefficient along the axial extension L of a first exhaust diffuser $D_1$ and a second exhaust diffuser $D_2$.

FIG. 4 shows the pressure recovery coefficient CP along the axial extension L of a first exhaust diffuser $D_1$ and a second exhaust diffuser $D_2$. Both first exhaust diffuser $D_1$ and second exhaust diffuser $D_2$ comprise supporting struts extending in a distance $L_1$ to $L_2$ from the beginning of the respective exhaust diffuser. The supporting struts of the first exhaust diffuser $D_1$ are single angle of incidence supporting struts. On the other hand the supporting struts of the second exhaust diffuser $D_2$ twisted supporting struts like the one shown in FIG. 3. Both exhaust diffusers $D_1$ and $D_2$ experience a pressure recovery coefficient drop at the beginning of the supporting struts. However, the pressure recovery coefficient rises more quickly again in case of the exhaust diffuser $D_2$ comprising the twisted struts.

Figure 5:
FIG. 5 shows a visualization of streamlines of an exhaust diffuser comprising single angle of incidence supporting struts at 10 percent of their span.

FIG. 5 shows a visualization of streamlines at 10 percent span of a single angle of incidence supporting strut 8 of an exhaust diffuser. Flow separation occurs leaving behind horseshoe vortexes 9 indicative of flow separation. This results in regions of low momentum fluid and partly exhaust diffuser blockage.

Figure 6:
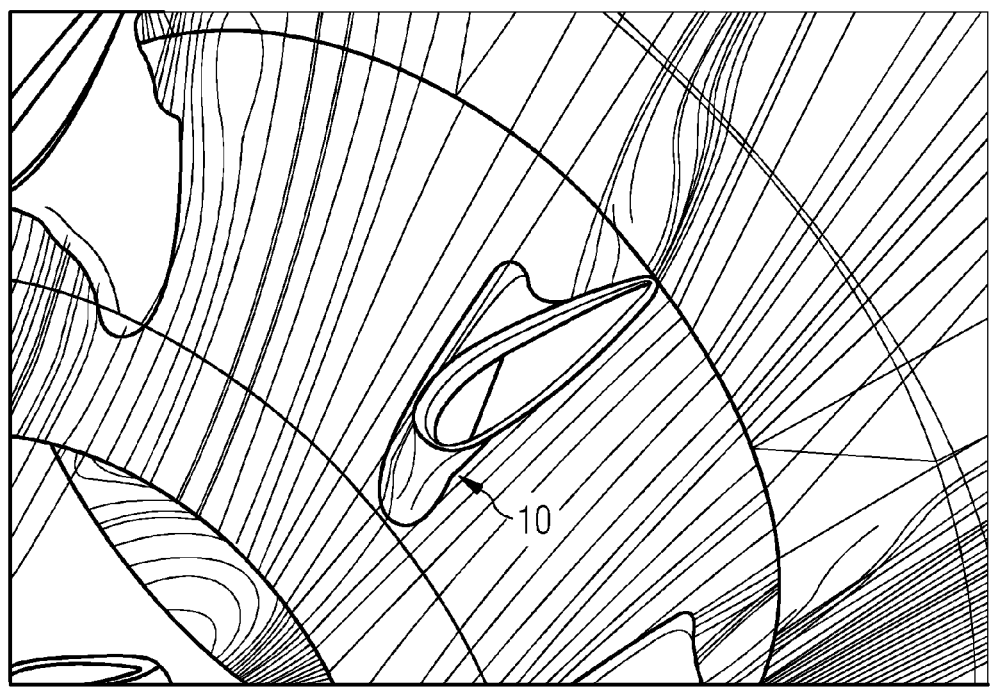
FIG. 6 shows a visualization of streamlines of an exhaust diffuser comprising twisted supporting struts at 10 percent of their span.

FIG. 6 shows a visualization of streamlines under the same conditions but with twisted supporting struts 10. No horseshoe vortexes are visible. Hence, pressure recovery may be enhanced.

Figure 7:
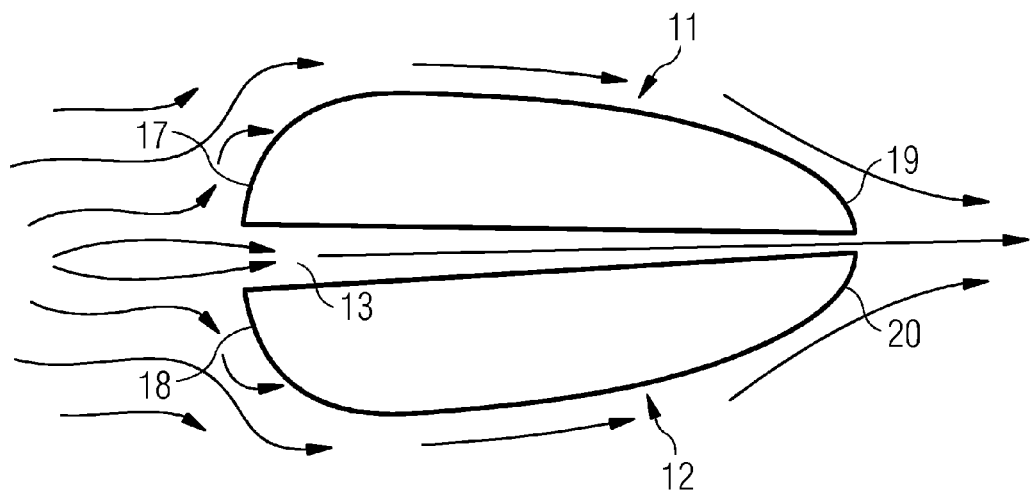
FIG. 7 shows in a very schematic form a first supporting strut and a second supporting strut forming a twin-strut at an angle of attack close to zero.
Figure 8:
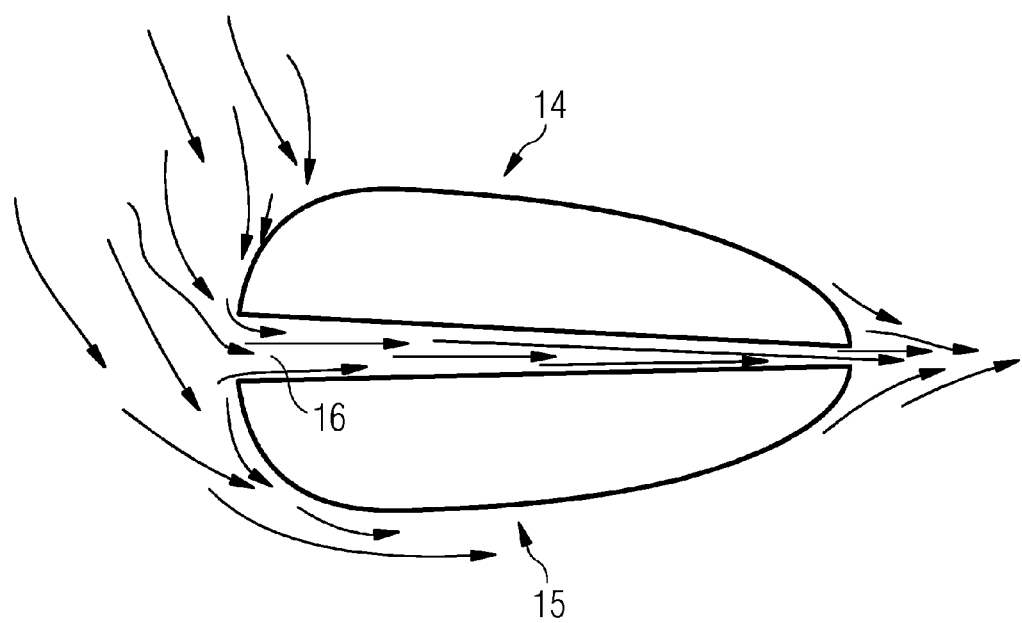
FIG. 8 shows in a very schematic form a first supporting strut and a second supporting strut forming a twin-strut at an angle of attack significantly different from zero.

FIGS. 7 and 8 show in a very schematic form a first supporting strut 11, 14 and a second supporting strut 12, 15 wherein the first supporting strut 11, 14 and the second supporting strut 12, 15 are arranged such as to form a twin-strut with an in flow-direction narrowing channel 13, 16 therein between.

The first supporting strut 11, 14 and the second supporting strut 12, 15 are strategically placed side-by-side in a mirrored configuration complementing each other. The distance therein between is optimized for the flow rate, and the distribution of the area from the leading edge to the trailing edge of the so-formed twin-strut is optimized such that the flow exiting the channel 13, 16 experiences acceleration to match the flow at the outside of the channel 13, 16. The first supporting strut 11, 14 and the second supporting strut 12, 15 will match each other to form an aerodynamically efficient profile.

At design flow angle the flow will treat the twin-strut as two individual supporting struts 11, 12 along the outer surfaces of the twin-strut. The channel 13 will keep the flow accelerated sufficiently towards the exit for low trailing edges losses. The slim leading edge 17, 18 and slim trailing edge 19, 20 of each of the supporting struts 11, 12 may reduce profile loss, i.e. loss due to the shape of the airfoil.

When the flow angle deviates from the design flow angle, i.e. the angle of attack deviates significantly from zero, the flow will primarily reach the outer surface of one of the supporting struts 14 of the pair. The twin-strut will look for the flow as a single supporting strut with a large leading edge radius. This large leading edge radius will reduce the risk of flow separation even at large angle of attack while any flow in the channel will again smoothly guide flow back to the exhaust diffuser axis at the trailing edge to reduce mixing losses.

The comparable large area presented by the twin-strut design may allow for lowering the number of struts connecting the inner member and the outer member without compromising the mechanical stability of the exhaust diffuser. Instead of having six individual struts, three twin-struts may be sufficient.

Pressure recovery may still further be improved by increasing the exit radius of the exhaust diffuser relative to the inlet radius of the exhaust diffuser.

The invention claimed is:

1. An exhaust diffuser for a torque-generating turbine, the exhaust diffuser comprising:

an inner member having an outer surface and an outer member having an inner surface, the inner member and the outer member forming an annular channel, a first supporting strut connecting the inner member and the outer member, the first supporting strut extending essentially radially from the inner surface to the outer surface, a second supporting strut, wherein the first supporting strut and the second supporting strut form a mirror twin-strut with an in flow-direction narrowing channel therein between;

the first supporting strut and the second supporting strut comprising a middle section having a first airfoil, an outer section having a second airfoil and an inner section having a third airfoil, the second airfoil having a higher angle of incidence than the first airfoil, and the third airfoil having a lower angle of incidence than the second airfoil.

2. The exhaust diffuser for a torque-generating turbine of claim 1, wherein a difference between the angle of incidence of the third airfoil and the angle of incidence of the second airfoil is between 0° and 40°.

3. The exhaust diffuser for a torque-generating turbine of claim 1, wherein the first airfoil has a smaller thickness than the second airfoil and/or the third airfoil.

4. The exhaust diffuser for a torque-generating turbine of claim 1, wherein the first airfoil has a smaller leading edge radius than the second airfoil and/or the third airfoil.

5. The exhaust diffuser for a torque-generating turbine of claim 1, wherein the first airfoil has a smaller camber than the second airfoil and the third airfoil.

6. The exhaust diffuser for a torque-generating turbine of claim 1, wherein the exhaust diffuser has an even number of first supporting struts and/or second supporting struts.

7. The exhaust diffuser for a torque-generating turbine of claim 1, wherein the exhaust diffuser has an odd number of first supporting struts and/or second supporting struts.

8. The exhaust diffuser for a torque-generating turbine of claim 1, wherein the exhaust diffuser has eight or fewer first supporting struts and/or second supporting struts.

9. The exhaust diffuser for a torque-generating turbine of claim 1, having four or fewer twin-struts.

10. The exhaust diffuser for a torque-generating turbine of claim 1, wherein a difference between the angle of incidence of the third airfoil and the angle of incidence of the second airfoil is between 5° and 30°.

11. The exhaust diffuser for a torque-generating turbine of claim 1, wherein a difference between the angle of incidence of the third airfoil and the angle of incidence of the second airfoil is between 5° and 20°.

12. The exhaust diffuser for a torque-generating turbine of claim 1, wherein the exhaust diffuser comprises six or fewer first supporting struts and/or second supporting struts.

13. The exhaust diffuser for a torque-generating turbine of claim 1, comprising three or fewer twin-struts.

14. The exhaust diffuser for a torque-generating turbine of claim 1, wherein the torque-generating turbine is a torque-generating gas turbine.

15. An exhaust diffuser for a torque-generating turbine, the exhaust diffuser comprising:

an inner member having an outer surface and an outer member having an inner surface, the inner member and the outer member forming an annular channel, a plurality of supporting struts in an annular ring, each supporting strut connecting the inner member and the outer member, and each supporting strut extending essentially radially from the inner surface to the outer surface, wherein every supporting strut in the annular ring comprises a middle section comprising a first airfoil, an outer section comprising a second airfoil, an inner section comprising a third airfoil, wherein the second airfoil comprises a positive angle of incidence that is greater than an angle of incidence of the first airfoil, wherein the third airfoil comprises a negative angle of incidence, and wherein each supporting strut comprises a minor symmetric twin-strut that defines an in flow-direction narrowing channel there between.

* * * * *